(12) United States Patent
Fan et al.

(10) Patent No.: US 11,177,700 B2
(45) Date of Patent: *Nov. 16, 2021

(54) WIRELESS ELECTRIC POWER SHARING BETWEEN VEHICLES

(71) Applicant: International Business Machines Corporation, Armonk, NY (US)

(72) Inventors: Si Bin Fan, Beijing (CN); Ge Liang, Xi'an (CN); Hao Sheng, Zhejiang (CN); Hai Dong Zhang, Xi'an (CN); Jinfan Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 16/672,460

(22) Filed: Nov. 3, 2019

(65) Prior Publication Data

US 2020/0067334 A1 Feb. 27, 2020

Related U.S. Application Data

(63) Continuation of application No. 15/293,491, filed on Oct. 14, 2016, now Pat. No. 10,468,897.

(51) Int. Cl.
*H02J 7/00* (2006.01)
*H02J 7/14* (2006.01)
(Continued)

(52) U.S. Cl.
CPC ............ *H02J 50/80* (2016.02); *B60L 53/126* (2019.02); *B60L 53/32* (2019.02); *B60L 53/38* (2019.02);
(Continued)

(58) Field of Classification Search
USPC ......................................................... 320/109
See application file for complete search history.

(56) References Cited

U.S. PATENT DOCUMENTS 10,468,897 B2 * 11/2019 Fan .................... H02J 7/342
10,581,260 B2 * 3/2020 Fan .................... H02J 50/12
(Continued)

FOREIGN PATENT DOCUMENTS

| CN | 203774810 U | 8/2014 |
| CN | 204465108 U | 7/2015 |

(Continued)

OTHER PUBLICATIONS

IBM: List of IBM Patents or Patent Applications Treated as Related, 2 pg.

(Continued)

*Primary Examiner* — Alexis B Pacheco
(74) *Attorney, Agent, or Firm* — Cuenot, Forsythe & Kim, LLC

(57) ABSTRACT

The disclosure involves wireless electric power sharing between vehicles. A first vehicle sends a charging request, wherein the first vehicle is at least partially powered by a first on-board rechargeable electricity storage. The first vehicle receives a response to the charging request from a second vehicle which is at least partially powered by a second on-board rechargeable electricity storage, and a communication channel is established between the first and second vehicles. The first on-board rechargeable electricity storage is charged using energy stored in the second on-board rechargeable electricity storage and wirelessly transferred from the second vehicle to the first vehicle. The charging is controlled with information exchanged between the first and second vehicles over the communication channel.

20 Claims, 5 Drawing Sheets

(51) Int. Cl.

| | |
|---|---|
| *H02J 50/80* | (2016.01) |
| *H02J 50/12* | (2016.01) |
| *H02J 7/02* | (2016.01) |
| *H02J 50/90* | (2016.01) |
| *B60L 53/38* | (2019.01) |
| *B60L 53/30* | (2019.01) |
| *H02J 7/34* | (2006.01) |
| *B60L 53/126* | (2019.01) |

(52) U.S. Cl.
CPC ............... *H02J 7/00* (2013.01); *H02J 7/025* (2013.01); *H02J 7/342* (2020.01); *H02J 50/12* (2016.02); *H02J 50/90* (2016.02); *B60L 2240/622* (2013.01); *B60L 2240/70* (2013.01); *H02J 7/00034* (2020.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01)

(56) References Cited

U.S. PATENT DOCUMENTS

| | | |
|---|---|---|
| 2009/0038902 A1 | 2/2009 | Yechuri |
| 2010/0237828 A1 | 9/2010 | Maegawa |
| 2011/0025267 A1 | 2/2011 | Kamen |
| 2011/0266996 A1 | 11/2011 | Sugano |
| 2012/0005031 A1 | 1/2012 | Jammer |
| 2013/0110296 A1 | 5/2013 | Khoo |
| 2013/0335032 A1 | 12/2013 | Kuribayashi |
| 2014/0002015 A1 | 1/2014 | Tripathi et al. |
| 2014/0320062 A1 | 10/2014 | Murayama |
| 2016/0368390 A1 | 12/2016 | Yang |
| 2018/0105054 A1 | 4/2018 | Fan et al. |
| 2018/0105056 A1 | 4/2018 | Fan et al. |

FOREIGN PATENT DOCUMENTS

| | | |
|---|---|---|
| CN | 103701167 B | 12/2015 |
| EP | 2757657 A1 | 7/2014 |
| KR | 20120041446 B1 | 5/2012 |

OTHER PUBLICATIONS

Fan, S.B. et al., "Wireless Electric Power Sharing Between Vehicles," U.S. Appl. No. 15/293,491, filed Oct. 14, 2016, 31 pages.

Fan, S.B. et al., "Wireless Electric Power Sharing Between Vehicles," U.S. Appl. No. 15/810,063, filed Nov. 12, 2017, 31 pages.

Wireless Charging, [online] Wikipedia, the Free Encyclopedia [machine translated retrieved Oct. 13, 2016] retrieved from the Internet: <https://zh.wikipedia.org/wiki/%E7%84%A1%E7%B7%9A%E5%85%85%E9%9B%BB>, 4 pg.

Shin, J. et al., "Design and Implementation of Shaped Magnetic-Resonance-Based Wireless Power Transfer System for Roadway-Powered Moving Electric Vehicles," In IEEE Trans. on Industrial Electronics, vol. 61, No. 3, Apr. 16, 2013, Abstract only, 3 pg.

Lukic, S. et al., "Cutting the Cord: Static and Dynamic Inductive Wireless Charging of Electric Vehicles," Electrification Magazine, IEEE, vol. 1, No. 1, Oct. 28, 2013, Abstract only, 3 pg.

Jang, Y.J. et al., "Optimal Design of the Wireless Charging Electric Vehicle," In 2012 IEEE Int'l. Conf. on Electric Vehicle, Mar. 4-5, 2012, Abstract only, 3 pg.

Kottasova, I. et al., "UK to Test New Roads That Charge Cars as They Drive," [online] CNN Money, Aug. 18, 2015, retrieved from the Internet: <http://money.cnn.com/2015/08/18/technology/uk-electric-cars-roads/>, 4 pg.

Li, O.W.T., "Whether the Wireless Charging Technology for Electric Vehicles Can Produce a Revolutionary Change?" [online] TechNews Science and Technology Daily [retrieved Sep. 15, 2016] retrieved from the Internet: <http://technews.tw/2015/12/31/wireless-power-electric-car/>, 3 pg.

* cited by examiner

WIRELESS ELECTRIC POWER SHARING BETWEEN VEHICLES

BACKGROUND

The present invention relates to wireless electric power sharing, and more specifically, to wireless electric power sharing between vehicles.

In recent years, with the shortage of oil resources and the awareness of the importance of environment protection, vehicles fully or partially driven by electric power are becoming popular, which are referred to as electric vehicles herein. Electricity can be stored on board the vehicle using electricity storage such as a battery, flywheel, or supercapacitors. Due to capacity limitation of the on-board electricity storage, electric vehicles need to be charged frequently, especially for a long journey. Therefore, how to charge an electric vehicle has come to be a hot research topic. Currently the charging for electric vehicles is usually performed via wired connections (e.g., using a charging pole), while on the other hand, wireless charging for electric vehicles has drawn much attention.

With wireless charging techniques, electric vehicles may be wirelessly charged while stopped at charging stations. Further, electric vehicles may be charged by wireless power transfer technologies while they travel along a roadway embedded with power coupling elements. For example, coils embedded in the roadway may wirelessly provide electric power to an electric vehicle traveling on the roadway through interactions with coils carried on the vehicle.

BRIEF SUMMARY

A method includes sending, by a first vehicle which is at least partially powered by a first on-board rechargeable electricity storage, a charging request. The method also can include receiving a response to the charging request from a second vehicle which is at least partially powered by a second on-board rechargeable electricity storage. The method also can include establishing a communication channel between the first and second vehicles. The method also can include, while the first and second vehicles are in motion, charging the first on-board rechargeable electricity storage using energy stored in the second on-board rechargeable electricity storage and wirelessly transferred from the second vehicle to the first vehicle, wherein the charging is controlled, using a processor, with information exchanged between the first and second vehicles over the communication channel, wherein a relative position of the first vehicle with respect to the second vehicle is automatically adjusted during the charging to ensure effective energy transfer from the second vehicle to the first vehicle by keeping a predetermined distance between the first vehicle and second vehicle.

A system includes a processor and a computer-readable memory unit coupled to the processor. The memory unit includes instructions that when executed by the processor cause a first vehicle which is at least partially powered by a first on-board rechargeable electricity storage to send a charging request, receive a response to the charging request from a second vehicle which is at least partially powered by a second on-board rechargeable electricity storage, establish a communication channel between the first and second vehicles and, while the first and second vehicles are in motion, charge the first on-board rechargeable electricity storage using energy stored in the second on-board rechargeable electricity storage and wirelessly transferred from the second vehicle to the first vehicle. The charging can be controlled with information exchanged between the first and second vehicles over the communication channel. A relative position of the first vehicle with respect to the second vehicle can be automatically adjusted during the charging to ensure effective energy transfer from the second vehicle to the first vehicle by keeping a predetermined distance between the first vehicle and second vehicle.

A computer program product includes a computer readable storage medium having program instructions embodied therewith. The program instructions are executable by a processor to cause a first vehicle which is at least partially powered by a first on-board rechargeable electricity storage to send a charging request, receive a response to the charging request from a second vehicle which is at least partially powered by a second on-board rechargeable electricity storage, establish a communication channel between the first and second vehicles and, while the first and second vehicles are in motion, charge the first on-board rechargeable electricity storage using energy stored in the second on-board rechargeable electricity storage and wirelessly transferred from the second vehicle to the first vehicle. The charging can be controlled with information exchanged between the first and second vehicles over the communication channel. A relative position of the first vehicle with respect to the second vehicle can be automatically adjusted during the charging to ensure effective energy transfer from the second vehicle to the first vehicle by keeping a predetermined distance between the first vehicle and second vehicle.

BRIEF DESCRIPTION OF THE SEVERAL VIEWS OF THE DRAWINGS

Through the more detailed description of some embodiments of the present disclosure with the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
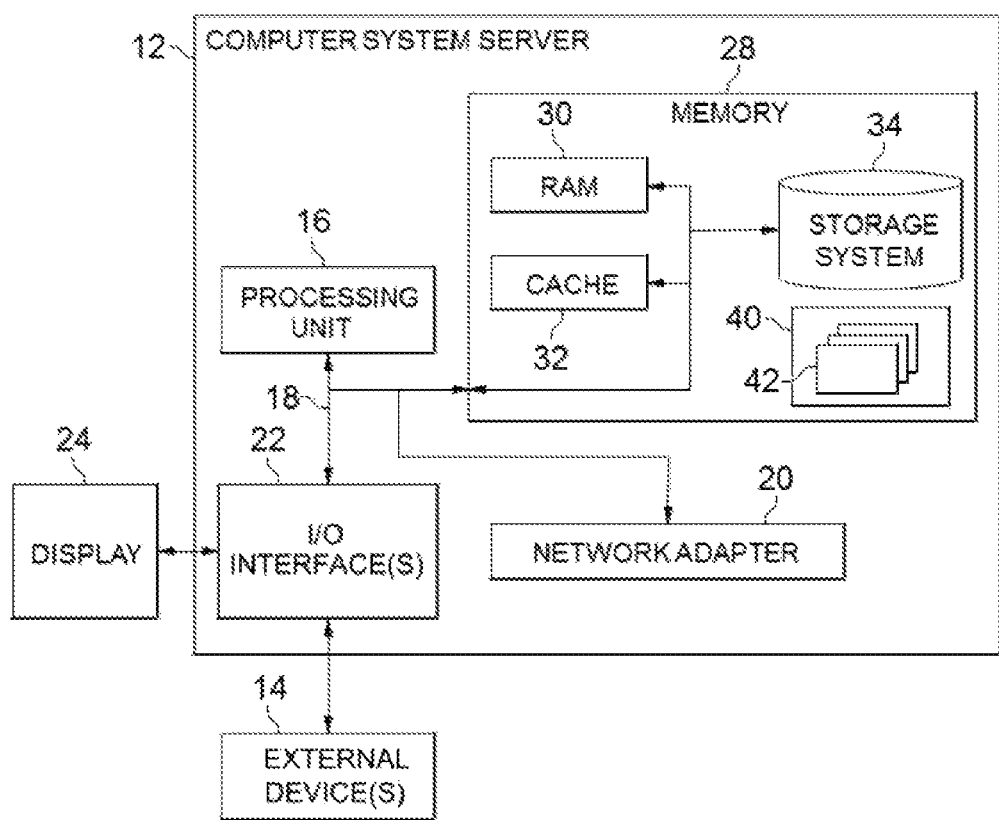
FIG. 1 shows an exemplary computer system which is applicable to implement embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, data archival storage systems, and charging coils, etc.

Some embodiments of the present invention may be implemented as the program/utility 40 or the program modules 42 of FIG. 1, which may be part of the vehicle control system. Now, with reference to FIGS. 2-6, some embodiments of the present invention will be described below.

Although electric vehicles have become popular in recent years, the power supply for the electric vehicles is still a challenge compared to traditional gasoline vehicles. For example, the number of charging points is not sufficient for the increasing numbers of electric vehicles, and some areas may suffer from a lack of charging points. Moreover, it is time consuming to stop and charge until the rechargeable battery of the vehicle is fully charged. Further, due to the limitation of battery capacity, a single charge for the vehicle may not support a long journey.

Wireless charging may mitigate the above problems to some extent. For example, wirelessly charging vehicles in motion by power coupling elements embedded in the roadway may support a longer journey and the vehicles can be charged without stopping. However, this wireless charging scheme requires a specially designed roadway and compatible vehicles, which is costly and difficult to be widely deployed. Therefore, there exists a need for a more convenient way to charge electric vehicles.

The present invention is directed to wireless electric power sharing between electric vehicles. The electric vehicle may be an all-electric vehicle only powered by electricity, or a vehicle partially powered by electric power, such as a hybrid vehicle. The embodiments of the present invention will be described using an electric vehicle powered by an on-board rechargeable battery as an example, but the vehicle may also be powered by other on-board electricity storage, such as flywheel energy storage or supercapacitors.

Figure 2A:
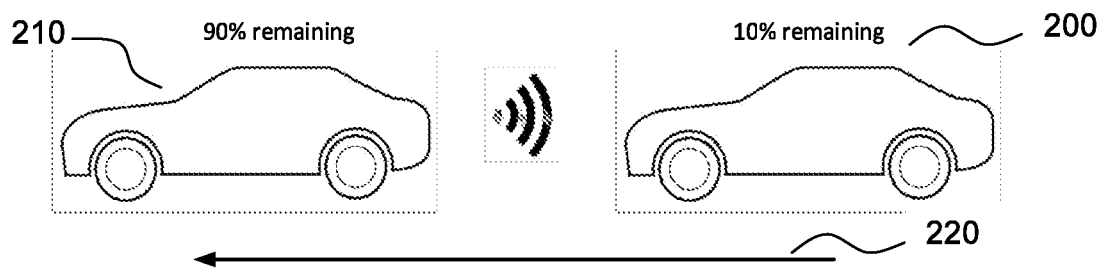
FIGS. 2A and 2B illustrate an exemplary wireless power sharing scenario between vehicles according to embodiments of the present invention.
Figure 2B:
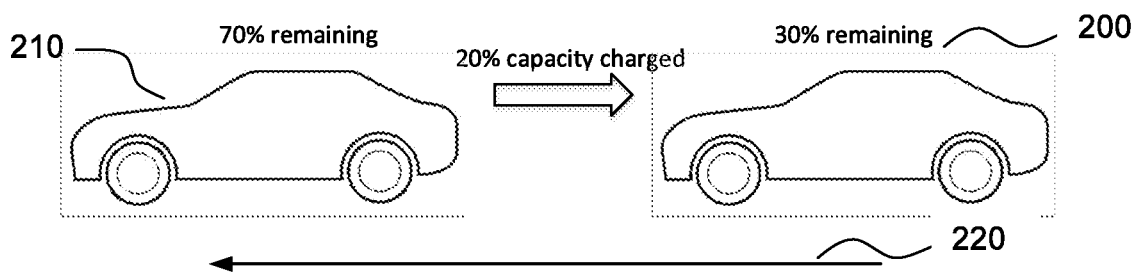

FIGS. 2A and 2B illustrate an exemplary wireless power sharing scenario between vehicle 200 and vehicle 210 according to embodiments of the present invention, wherein FIG. 2A shows a situation during the wireless power sharing, and FIG. 2B shows a situation when the wireless power sharing is finished.

As shown in FIGS. 2A and 2B, vehicle 200 and vehicle 210 are traveling in the same direction (as indicated by the arrow 220) and vehicle 210 is in front of vehicle 200. The remaining capacity of a rechargeable battery of vehicle 200 is low and needs to be charged to continue the trip, while the remaining capacity of a rechargeable battery of vehicle 210 is sufficient. Assume that the remaining capacity of the battery of vehicle 200 is 10% of the full capacity, and the remaining capacity of the battery of vehicle 210 is 90% of the full capacity, the full capacities of both vehicle 200 and 210 are the same, and the power dissipation in energy transformation is not counted in.

As shown in FIG. 2A, vehicle 200 has requested for an amount of power, e.g., 20% of the full capacity, from vehicle 210. After approval by vehicle 210, the rechargeable battery of vehicle 200 can be charged by energy wirelessly transferred from vehicle 210.

When the wireless power sharing is finished, as shown in FIG. 2B, the remaining capacity of vehicle 200 is increased to 30% and the remaining capacity of vehicle 210 is decreased to 70%. That is, 20% of the full capacity has been wirelessly transferred from vehicle 210 to vehicle 200 through wireless power sharing. Then the two vehicles may separate and travel independently.

With the wireless power sharing between vehicles, vehicle 200 can be charged to continue its trip even if there is no charge station nearby or the roadway is not equipped with power supply elements. This may also save time for conventional charging at the charge station, since the power sharing between vehicles can occur while they are moving. It would be appreciated that although FIGS. 2A and 2B show the two vehicles are in motion, they can alternatively be stopped during the charging.

Figure 3:
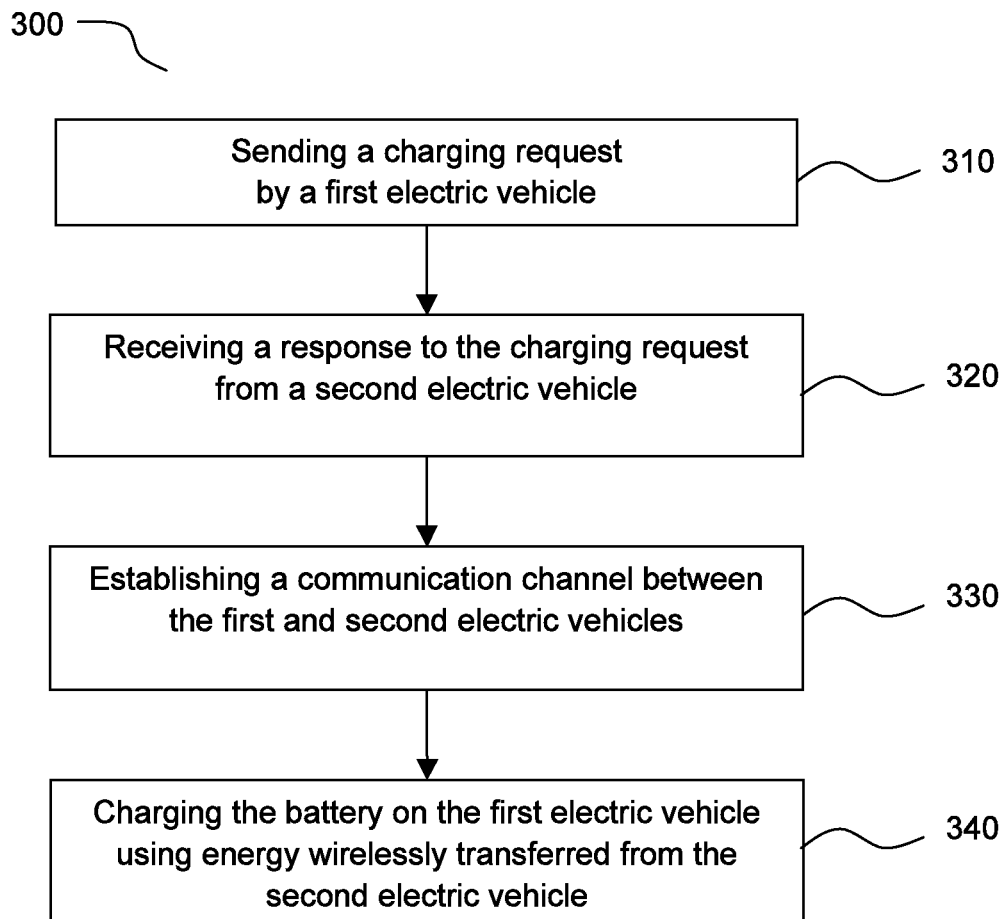
FIG. 3 is a flow chart showing an exemplary method according to embodiments of the present invention.

FIG. 3 is a flow chart showing an exemplary method 300 according to embodiments of the present invention. There are two vehicles, e.g., vehicle 200 and 210 as shown in FIGS. 2A and 2B, involved in method 300 of FIG. 3. However, it would be appreciated that method 300 can be applied to more vehicles. For example, one vehicle may transmit energy to two or more vehicles, and may also receive energy from two or more vehicles.

At block 310, a first vehicle, e.g., vehicle 200, may send a charging request. Vehicle 200 may be a vehicle at least partially powered by an on-board rechargeable electricity storage, such as a rechargeable battery. The charging request may be sent automatically in response to the remaining capacity of the battery below a threshold, or may be sent in response to a user operation.

According to an embodiment, the charging request may comprise an amount of power required by vehicle 200. The required amount of power may be a relative amount of power, for example, a percentage of the full capacity as in FIG. 2A, or may be an absolute amount of power, e.g., power in units of amp-hour. As another example, the required amount of power may comprise a duration of charging.

According to an embodiment, the charging request may comprise information about vehicle 200, such as characteristics of its battery, current position (e.g., GPS data) of vehicle 200, destination of the trip, etc.

According to an embodiment, the charging request may be sent to vehicles within a particular range from vehicle 200. The range may be automatically determined based on one or more factors, such as the communication protocol used for sending the request, the road traffic, the remaining capacity of the battery of vehicle 200, etc., or be manually set by the driver or passenger of vehicle 200. Alternatively, the charging request may be sent to a particular vehicle, e.g., a vehicle that has established a connection with vehicle 200 or a vehicle shows a willingness for power sharing.

At block 320, vehicle 200 may receive a response to the charging request from a second vehicle, e.g., vehicle 210. Vehicle 210 may also be a vehicle at least partially powered by an on-board rechargeable electricity storage, such as a rechargeable battery. The response may indicate that the charging request of vehicle 200 is approved by vehicle 210. According to an embodiment, the response may comprise information about vehicle 210, such as characteristics of its battery, current position (e.g., GPS data) of vehicle 210, destination of the trip, etc.

At block 330, a communication channel may be established between vehicles 200 and 210. The communication channel may be a direct communication channel or an indirect communication channel between vehicles 200 and 210. For example, a direct communication channel may be established between the vehicles using Bluetooth technology. As another example, an indirect communication channel may be established between the vehicles via a remote server through cellular network (such as LTE network), wherein the information to be exchanged between the vehicles is processed, if necessary, and forwarded by the server to the vehicles. The communication channel can be used to exchange information, such as vehicle positions, battery characteristics and energy transmitter/receiver characteristics, between vehicles 200 and 210 before and/or during the charging to facilitate the charging. It would be appreciated that, although FIG. 3 shows block 330 as following block 320, block 330 can also be performed prior to block 320 or prior to block 310.

At block 340, the rechargeable battery of vehicle 200 is charged by energy stored in the rechargeable battery of vehicle 210 and wirelessly transferred from vehicle 210. The charging may be controlled with the information exchanged between vehicles 200 and 210 over the communication channel. The charging may be performed while both vehicles 200 and 210 are in motion or both of them are stopped.

The charging may start upon receiving the response from vehicle 210 or upon the communication channel being established. Alternatively, vehicles 200 and 210 may further communicate with each other over the communication channel before the charging. For example, vehicles 200 and 210 may further communicate to complete the handshake or to reach an agreement. As another example, the relative position of the two vehicles may be detected and adjusted before the charging such that they can move together to ensure an effective charging. During the charging, vehicles 200 and 210 may continue the communication over the established channel to exchange necessary information. The charging may be stopped in response to the required amount of power indicated in the charging request has been charged.

More details of method 300 will be described below.

In an embodiment, the charging request may be broadcasted from vehicle 200 to a plurality of vehicles, e.g., to all vehicles within a range from vehicle 200. Vehicle 210 willing to sharing power with vehicle 200 may respond to the charging request, and a wireless connection, e.g., a direct communication channel, may be established between vehicles 200 and 210 to communicate information necessary for the charging. Then the rechargeable battery of vehicle 200 may be charged using energy wirelessly transferred from vehicle 210.

In another embodiment, a plurality of vehicles including vehicle 200 may be registered to a server which schedules power sharing among the plurality of vehicles. Vehicle 200 may send a charging request to the server, which in turn is forwarded by the server to other registered vehicles. Preferably, the charging request may be forwarded to vehicles in the vicinity of vehicle 200. Vehicle 210 which has received the forwarded charging request and is willing to share power with vehicle 200 may send a response to vehicle 200. A direct communication channel or an indirect communication channel via the server can be established between vehicles 200 and 210. Then the rechargeable battery of vehicle 200 may be charged using energy wirelessly transferred from vehicle 210. During the charging, information can be directly or indirectly communicated between vehicles 200 and 210 to facilitate an effective charging.

In still another embodiment, vehicle 200 may have established a communication channel with one or more vehicles before sending the charging request. The communication channel may be established between vehicle 200 and one or more nearby vehicles when they are traveling along a roadway. The communication channel may be automatically established by communication modules carried on the vehicles based on a variety of communication technologies, such as Bluetooth (BT) technology, radio frequency identification (RFID) technology, infrared data association (IrDA) technology, ultra-wideband (UBW) technology, and so on. Alternatively, the establishment of the communication channel may be manually triggered by an operation of the driver or passenger in vehicle 200. After the communication channel is established, vehicle 200 may send the charging request to one or more of the connected vehicles over the communication channel. Upon receiving the request, vehicle 210 willing to share power with vehicle 200 may send a response to vehicle 200 over the communication channel. The rechargeable battery of vehicle 200 may then be charged using energy wirelessly transferred from vehicle 210.

In yet another embodiment, vehicles willing to share electric power may configure themselves as discoverable, and vehicle 200 may search for such discoverable vehicles and send the charging request to one or more of them. Once an agreement is reached between vehicles 200 and 210, the charging can take place.

As mentioned above, the charging request may be sent to more than one vehicle so as to obtain more opportunities for being charged. So it is possible that vehicle 200 may receive responses to the charging request from a plurality of vehicles. In such a case, the rechargeable battery of vehicle 200 may be charged by the plurality of vehicles simultaneously. Alternatively, vehicle 200 may select at least one vehicle 210 from the plurality of responding vehicles according to one or more criteria, e.g., based on the remaining capacity of the responding vehicles, distances of the responding vehicles with respect to vehicle 200, destinations of the responding vehicles, etc. The selection may be performed automatically by vehicle 200 or manually by the driver or passenger of vehicle 200. In the manual case, information of the plurality of responding vehicles may be displayed to the driver or passenger, for example on a display provided in vehicle 200, so as to facilitate the selection.

Now, with reference to FIGS. 4 to 6, some processes for the wireless charging between vehicles will be discussed.

Figure 4A:
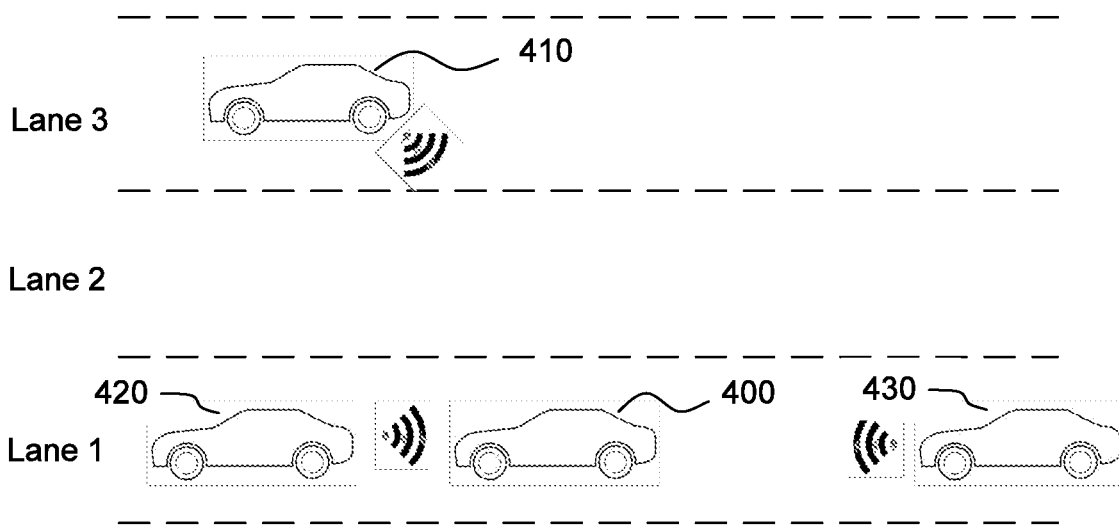
FIGS. 4A and 4B illustrate a scenario of adjusting the relative position of vehicles during the charging according to embodiments of the present invention.
Figure 4B:
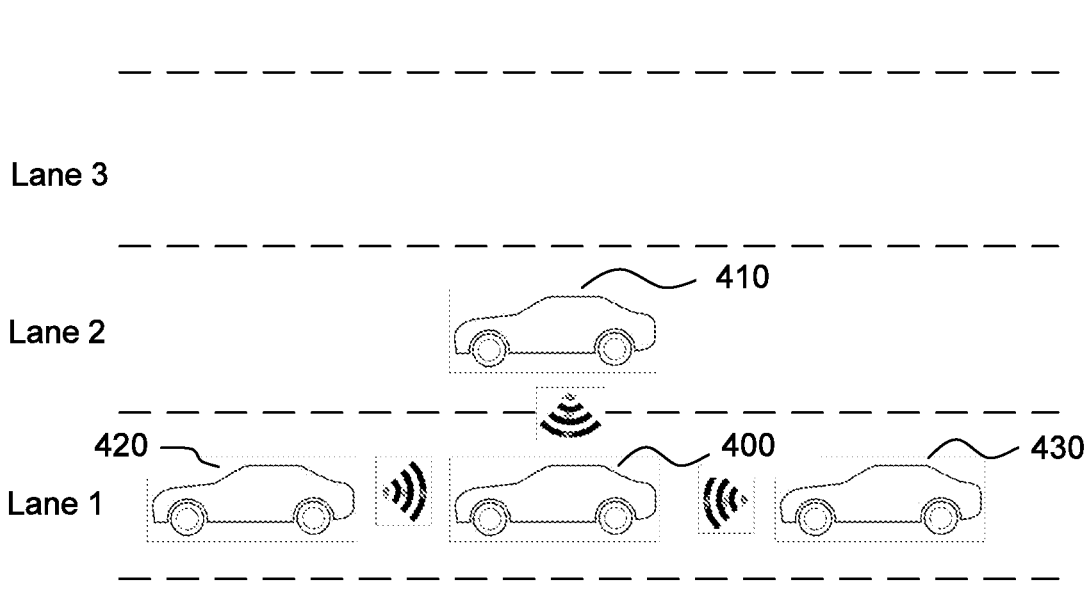

FIGS. 4A-4B show a scenario of adjusting the relative position of vehicles during the charging according to embodiments of the present invention. It should be appreciated that the adjustment can also be made before the charging.

As an exemplary embodiment, FIGS. 4A-4B show vehicle 400 moving and being charged by another moving vehicle 410, 420 or 430. Vehicles 410, 420 and 430 are in different positions relative to vehicle 400, representing three exemplary situations for the charging. It would be appreciated that, although vehicle 400 is charged by one of vehicles 410, 420 and 430 in the following discussion, it can instead be charged by all of the three vehicles 410, 420 and 430 simultaneously, and the position adjustment described below is still applicable.

As shown in FIG. 4A, vehicle 420, vehicle 430 and vehicle 400 are traveling in lane 1, and vehicle 410 is traveling in lane 3. Further, either the distance of vehicle 410 or the distance of vehicle 430 with respect to vehicle 400 is larger than the distance of vehicle 420 with respect to vehicle 400.

In the case where vehicle 400 is charged by vehicle 420, the energy coupling between them is strong enough such that the wireless charging can work well. Therefore, no adjustment of the relative position is needed. In the case where vehicle 400 is charged by vehicle 410 or 430, the energy coupling between them may be weak and the energy of vehicle 410 or 430 may not be effectively transferred to vehicle 400. Therefore, the relative positions of vehicle 410 or 430 with respect to vehicle 420 may need adjustment. This adjustment can be performed throughout the charging to ensure effective energy transfer all the time.

For example, as shown in FIG. 4B, vehicle 430 may speed up to shorten the distance from vehicle 400 and thus improve the energy coupling. Similarly, vehicle 410 may lower its speed and/or change from lane 3 to lane 2 to shorten the distance from vehicle 400 and thus improve the energy coupling. Of course, the relative position can also be adjusted by changing the speed or lane of vehicle 400.

In one embodiment, the relative position of vehicles may be adjusted automatically. Take vehicles 400 and 430 as an example. At least one of vehicles 400 and 430 may monitor the relative distance between them using on-board sensors, e.g., a radar, and communicate this information over the communication channel between vehicles 400 and 430. Then the information may be used to keep a predetermined distance between vehicle 400 and vehicle 430 based on, e.g., adaptive cruise control (ACC). Here, the predetermined distance may be set to ensure effective energy transfer between the vehicles.

As another example, the relative position of vehicle 400 and vehicle 430 may be adjusted based on the charging current or the magnetic intensity during the charging. For example, when a sensor provided in vehicle 400 detects that the charging current is below a predetermined level or the magnetic intensity is below a predetermined value, which indicates a weak energy coupling, vehicle 400 may be controlled to change its position with respect to vehicle 430 for efficient charging.

As yet another example, the relative position of vehicle 400 and vehicle 430 may be adjusted based on the signal strength over the established communication channel between them. When the signal strength is lower than a predetermined value, which indicates a weak energy coupling, vehicle 400 may be controlled to change its position with respect to vehicle 430.

In one embodiment, the relative position of vehicle 400 with respect to vehicle 430 may be adjusted based on the control of the driver or the passenger of vehicle 400 or 430. For example, an alert may be provided to the driver or passenger when the energy coupling is weak. The alert may be audio, visual, haptic or the like. As another example, a graphical user interface may be displayed on the display of vehicle 400 or 430, showing the current relative positions of the vehicles involved in the power sharing. The driver or passenger of vehicle 400 or 430 may adjust the speed and/or position accordingly to ensure effective energy transfer.

The rechargeable battery of a vehicle may be charged by energy from another vehicle through various wireless charging techniques. In one embodiment, the wireless charging between vehicles may be realized by coupling energy through coils provided in both vehicles, e.g., using resonant inductive coupling. Resonant inductive coupling is a near field wireless transmission of energy between two magnetically coupled coils that are part of resonant circuits tuned to resonate at the same frequency. The vehicle being charged can convert the magnetic oscillating energy received by the coil to electric power to charge the battery.

Figure 5:
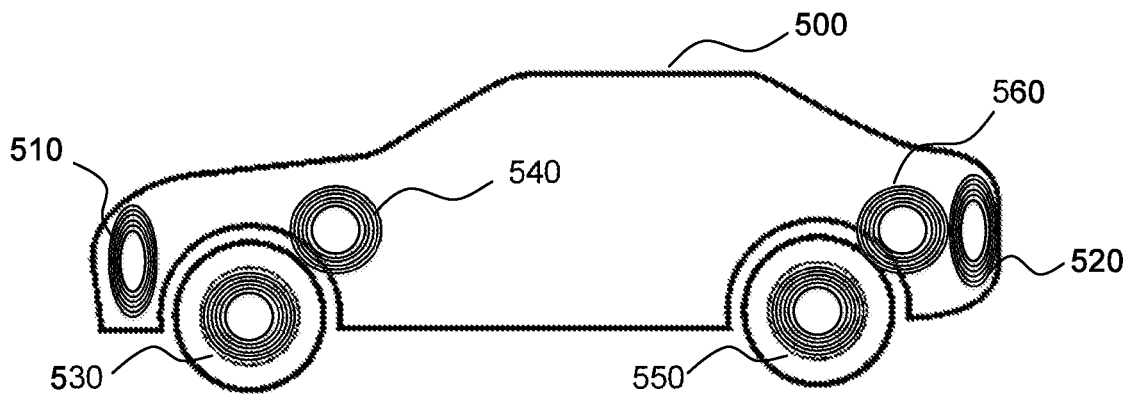
FIG. 5 is a schematic diagram illustrating an exemplary coil arrangement of a vehicle according to embodiments of the present invention.

FIG. 5 is a schematic diagram illustrating an exemplary coil arrangement of electric vehicle 500 according to embodiments of the invention.

Vehicle 500 may comprise a plurality of coils disposed at different positions of the vehicle. For example, as shown in FIG. 5, six coils are disposed in vehicle 500, that is, a front coil 510 in the front of vehicle, a back coil 520 in the back of vehicle 500, and four wheel coils 530, 540, 550, and 560 disposed in the four wheels respectively.

Each of the coils of vehicle 500 may be used to receive energy transferred from one or more coupled coils disposed in other vehicles. Further, each of the coils of vehicle 500 may also be used to transmit energy to one or more coupled coils disposed in other vehicles.

It should be noted that the arrangement of coils shown in FIG. 5 is only illustrative and is not intended to suggest any limitation as to the scope of the invention described herein. The coils may be disposed at other positions of the vehicle so long as they can implement the charging. Moreover, the energy transfer may be performed by various energy transmitters/receivers, not limited to the coils.

FIGS. 6A-6D illustrate scenarios where different coils are selected in different situations to receive energy from another vehicle according to embodiments of the invention. For the sake of clarity, only the coils selected for charging are illustrated in FIGS. 6A-6D. Again, although coils are illustrated in FIGS. 6A-6D to transmit and receive energy as an example, other energy transmitters and receivers may be used in these scenarios.

As shown in FIGS. 6A-6D, vehicle 600 is being charged by vehicle 610. The plurality of coils of vehicle 600 and vehicle 610 may be disposed as illustrated in FIG. 5. During the charging, at least one coil of vehicle 600 having the highest coupling efficiency with vehicle 610 may be selected to receive energy from vehicle 610. For example, the coil may be selected based on the distances of the coils of vehicle 600 from vehicle 610, as the coupling efficiency is a function of the distance between coils. Also, at least one coil of vehicle 610 having the highest coupling efficiency with vehicle 600 may be selected to transmit energy to vehicle 600.

In one embodiment, a common magnetic resonant frequency of the coils may be negotiated between vehicle 600 and vehicle 610 over the established communication channel before the charging. When the magnetic resonant frequency of a coil of vehicle 600 is the same or near the magnetic resonant frequency of a coil of vehicle 610, the energy of vehicle 610 may be wirelessly transferred to the coil of vehicle 600 such that the rechargeable battery of vehicle 600 is charged.

Figure 6A:
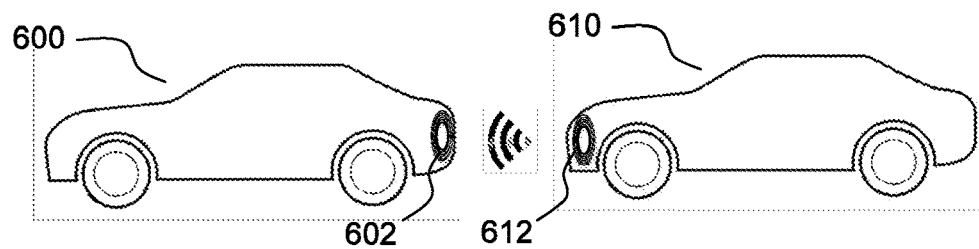
FIGS. 6A-6D illustrate scenarios where different coils are selected in different situations to receive energy from another vehicle according to embodiments of the present invention.

In FIG. 6A, vehicle 600 and vehicle 610 are traveling in the same lane and vehicle 600 is in front of vehicle 610. The back coil 602 of vehicle 600 and the front coil 612 of vehicle 610 are selected to receive and transmit energy respectively, since these two coils are the closest among all the coils and thus the coupling efficiency between them should be the highest.

Figure 6B:
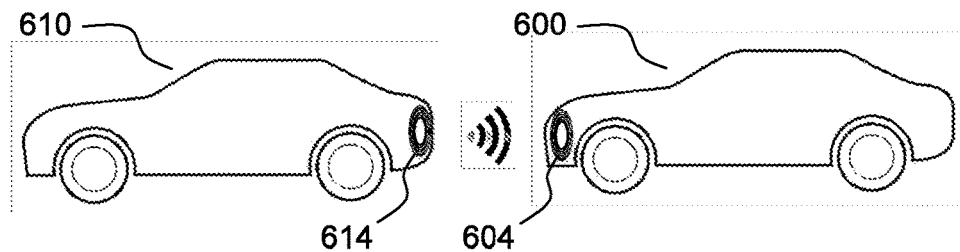

Similarly, in FIG. 6B, vehicle 600 and vehicle 610 are traveling in the same lane and vehicle 600 is behind vehicle 610. The front coil 604 of vehicle 600 is selected to receive energy from coil 614 of vehicle 610.

Figure 6C:
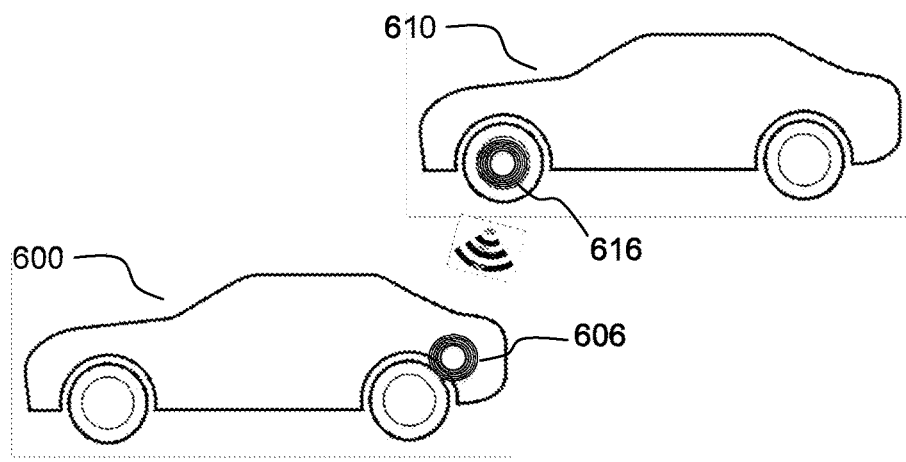

In FIG. 6C, vehicle 600 is traveling in a left lane from vehicle 610 and also in front of vehicle 610. The wheel coil 606 disposed in the rear-right wheel of vehicle 600 is selected to receive energy from coil 616 of vehicle 610. Alternatively, both the wheel coil 606 and the back coil 602 may be selected to receive the energy from vehicle 600 (not shown).

Figure 6D:
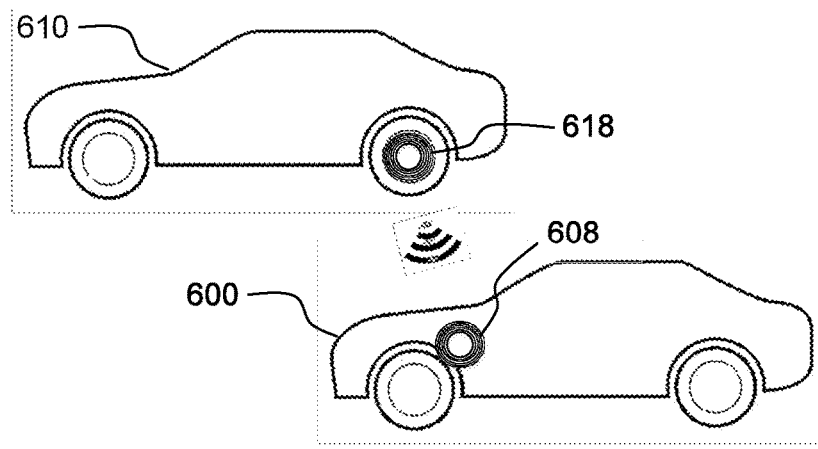

In FIG. 6D, vehicle 600 is traveling in a left lane from vehicle 610, and vehicle 600 is behind vehicle 610. The wheel coil 608 disposed in the front-right wheel of vehicle 600 is selected to receive energy from coil 618 of vehicle 610. Alternatively, both the wheel coil 608 and the front coil 604 may be selected to receive energy from vehicle 610 (not shown).

In one embodiment, the selection of coil for receiving or transmitting energy may be performed automatically. For example, sensors provided in vehicle 600 may detect the magnetic intensity at each coil, and the coil with the largest magnetic intensity may be selected to receive energy from vehicle 610.

In one embodiment, the coil for receiving or transmitting energy may be selected by the driver or passenger of the vehicle. For example, a user interface may be displayed on the display of vehicle 600, showing the relative positions of vehicle 600 and vehicle 610 and the arrangement of coils. The driver or passenger of vehicle 600 may select at least one coil closest to vehicle 610 to receive the energy from vehicle 610.

The present invention may be a system, a method, and/or a computer program product. The computer program product may include a computer readable storage medium (or media) having computer readable program instructions thereon for causing a processor to carry out aspects of the present invention.

According to an embodiment of the present invention, a system is provided, which comprises a processor and a computer-readable memory unit coupled to the processor. The memory unit comprises instructions that when executed by the processor cause a first vehicle which is at least partially powered by a first on-board rechargeable electricity storage to: send a charging request; receive a response to the charging request from a second vehicle which is at least partially powered by a second on-board rechargeable electricity storage; establish a communication channel between the first and second vehicles; and charge the first on-board rechargeable electricity storage using energy stored in the second on-board rechargeable electricity storage and wirelessly transferred from the second vehicle to the first vehicle. The charging is controlled with information exchanged between the first and second vehicles over the communication channel.

According to an embodiment of the system, the charging request is sent to vehicles within a particular range from the first vehicle.

According to an embodiment of the system, the charging occurs while both the first and the second vehicles are in motion.

According to an embodiment of the system, a relative position of the first vehicle with respect to the second vehicle is adjusted during the charging to ensure effective energy transfer from the second vehicle to the first vehicle.

According to an embodiment of the system, the relative position is adjusted based on the information exchanged between the first and second vehicles over the communication channel.

According to an embodiment of the system, the energy is wirelessly transferred through coils provided in the first vehicle and the second vehicle, and wherein a common magnetic resonant frequency of the coils is negotiated between the first and second vehicles over the communication channel.

According to an embodiment of the system, the first vehicle comprises a plurality of energy receivers disposed at different positions of the first vehicle, and wherein at least one of the plurality of energy receivers having the highest coupling efficiency with the second vehicle is selected to receive the energy from the second vehicle.

According to an embodiment of the present invention, a computer program product is provided, which comprises a computer readable storage medium having program instructions embodied therewith. The program instructions are executable by a processor to cause a first vehicle which is at least partially powered by a first on-board rechargeable electricity storage to: send a charging request; receive a response to the charging request from a second vehicle which is at least partially powered by a second on-board rechargeable electricity storage; establish a communication channel between the first and second vehicles; and charge the first on-board rechargeable electricity storage using energy stored in the second on-board rechargeable electricity storage and wirelessly transferred from the second vehicle to the first vehicle.

According to an embodiment of the computer program product, the charging request is sent to vehicles within a particular range from the first vehicle.

According to an embodiment of the computer program product, the charging occurs while both the first and the second vehicles are in motion.

According to an embodiment of the computer program product, a relative position of the first vehicle with respect to the second vehicle is adjusted during the charging to ensure effective energy transfer from the second vehicle to the first vehicle.

According to an embodiment of the computer program product, the relative position is adjusted based on the information exchanged between the first and second vehicles over the communication channel.

According to an embodiment of the computer program product, the energy is wirelessly transferred through coils provided in the first vehicle and the second vehicle, and wherein a common magnetic resonant frequency of the coils is negotiated between the first and second vehicles over the communication channel.

According to an embodiment of the computer program product, the first vehicle comprises a plurality of energy receivers disposed at different positions of the first vehicle, and wherein at least one of the plurality of energy receivers having the highest coupling efficiency with the second vehicle is selected to receive the energy from the second vehicle.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor; and
    a computer-readable memory unit coupled to the processor, the memory unit comprising instructions that when executed by the processor cause a first vehicle which is at least partially powered by a first on-board rechargeable electricity storage to:
    send a charging request;
    receive a response to the charging request from a second vehicle which is at least partially powered by a second on-board rechargeable electricity storage;
    establish a communication channel between the first and second vehicles; and
    while the first and second vehicles are in motion, charge the first on-board rechargeable electricity storage using energy stored in the second on-board rechargeable electricity storage and wirelessly transferred from the second vehicle to the first vehicle, wherein the charging is controlled with information exchanged between the first and second vehicles over the communication channel, wherein a relative position of the first vehicle with respect to the second vehicle is automatically adjusted during the charging to ensure effective energy transfer from the second vehicle to the first vehicle by keeping a predetermined distance between the first vehicle and second vehicle.

2. The system of claim 1, wherein the relative position is adjusted based on the information exchanged between the first and second vehicles over the communication channel.

3. The system of claim 1, wherein the energy is wirelessly transferred through coils provided in the first vehicle and the second vehicle, and wherein a common magnetic resonant frequency of the coils is negotiated between the first and second vehicles over the communication channel.

4. The system of claim 1, wherein the first vehicle comprises a plurality of energy receivers disposed at different positions of the first vehicle, each of the energy receivers configured to charge the first on-board rechargeable electricity storage, and wherein at least one of the plurality of energy receivers having the highest coupling efficiency with the second vehicle is selected to charge the first on-board rechargeable electricity storage by receiving the energy from the second vehicle.

5. The system of claim 4, wherein at least one of the plurality of energy receivers is a coil disposed in a wheel of the first vehicle.

6. The system of claim 4, wherein the plurality of energy receivers comprises a respective coil disposed in each of four wheels of the first vehicle.

7. The system of claim 4, wherein at least one of the plurality of energy receivers is a coil disposed at a front of the first vehicle.

8. The system of claim 4, wherein at least one of the plurality of energy receivers is a coil disposed at a back of the first vehicle.

9. A computer program product, comprising a computer readable storage medium having program instructions embodied therewith, the program instructions executable by a processor to cause a first vehicle which is at least partially powered by a first on-board rechargeable electricity storage to:
    send a charging request;
    receive a response to the charging request from a second vehicle which is at least partially powered by a second on-board rechargeable electricity storage;
    establish a communication channel between the first and second vehicles; and
    while the first and second vehicles are in motion, charge the first on-board rechargeable electricity storage using energy stored in the second on-board rechargeable electricity storage and wirelessly transferred from the second vehicle to the first vehicle, wherein the charging is controlled with information exchanged between the first and second vehicles over the communication channel, wherein a relative position of the first vehicle with respect to the second vehicle is automatically adjusted during the charging to ensure effective energy transfer from the second vehicle to the first vehicle by keeping a predetermined distance between the first vehicle and second vehicle.

10. The computer program product of claim 9, wherein the relative position is adjusted based on the information exchanged between the first and second vehicles over the communication channel.

11. The computer program product of claim 9, wherein the energy is wirelessly transferred through coils provided in the first vehicle and the second vehicle, and wherein a common magnetic resonant frequency of the coils is negotiated between the first and second vehicles over the communication channel.

12. The computer program product of claim 9, wherein the first vehicle comprises a plurality of energy receivers disposed at different positions of the first vehicle, each of the energy receivers configured to charge the first on-board rechargeable electricity storage, and wherein at least one of the plurality of energy receivers having the highest coupling efficiency with the second vehicle is selected to charge the first on-board rechargeable electricity storage by receiving the energy from the second vehicle.

13. The computer program product of claim 12, wherein at least one of the plurality of energy receivers is a coil disposed in a wheel of the first vehicle.

14. The computer program product of claim 12, wherein the plurality of energy receivers comprises a respective coil disposed in each of four wheels of the first vehicle.

15. The computer program product of claim 12, wherein at least one of the plurality of energy receivers is a coil disposed at a front of the first vehicle.

16. The computer program product of claim 12, wherein at least one of the plurality of energy receivers is a coil disposed at a back of the first vehicle.

17. A method, comprising:
sending, by a first vehicle which is at least partially powered by a first on-board rechargeable electricity storage, a charging request;
receiving a response to the charging request from a second vehicle which is at least partially powered by a second on-board rechargeable electricity storage;
establishing a communication channel between the first and second vehicles; and
while the first and second vehicles are in motion, charging the first on-board rechargeable electricity storage using energy stored in the second on-board rechargeable electricity storage and wirelessly transferred from the second vehicle to the first vehicle, wherein the charging is controlled, using a processor, with information exchanged between the first and second vehicles over the communication channel, wherein a relative position of the first vehicle with respect to the second vehicle is automatically adjusted during the charging to ensure effective energy transfer from the second vehicle to the first vehicle by keeping a predetermined distance between the first vehicle and second vehicle.

18. The method of claim 17, wherein the relative position is adjusted based on the information exchanged between the first and second vehicles over the communication channel.

19. The method of claim 17, wherein the energy is wirelessly transferred through coils provided in the first vehicle and the second vehicle, and wherein a common magnetic resonant frequency of the coils is negotiated between the first and second vehicles over the communication channel.

20. The method of claim 17, wherein the first vehicle comprises a plurality of energy receivers disposed at different positions of the first vehicle, each of the energy receivers configured to charge the first on-board rechargeable electricity storage, and wherein at least one of the plurality of energy receivers having the highest coupling efficiency with the second vehicle is selected to charge the first on-board rechargeable electricity storage by receiving the energy from the second vehicle.

* * * * *